Patented Oct. 3, 1922.

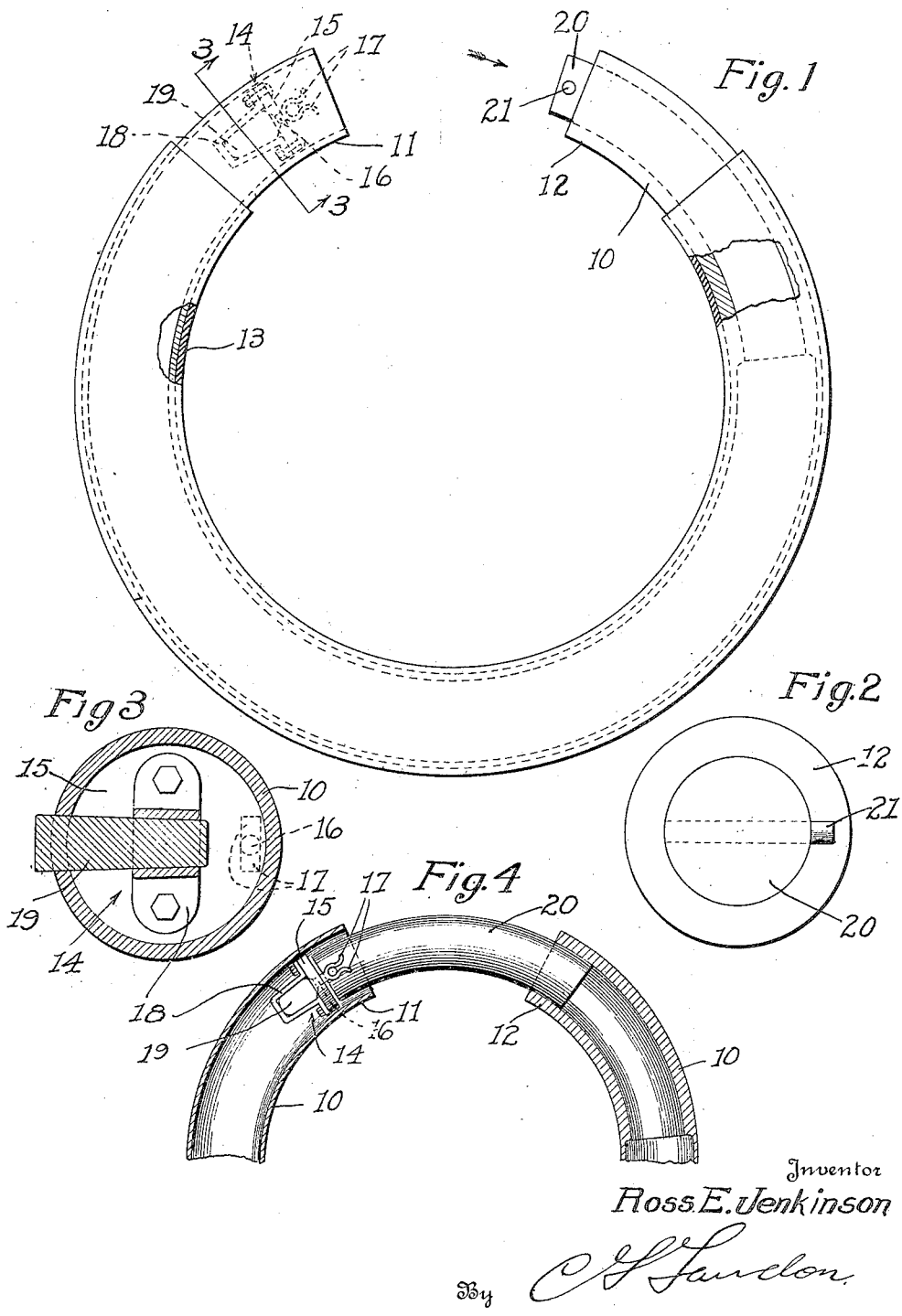

1,431,118

UNITED STATES PATENT OFFICE.

ROSS E. JENKINSON, OF AKRON, OHIO, ASSIGNOR TO THE GOODYEAR TIRE & RUBBER COMPANY, OF AKRON, OHIO, A CORPORATION OF OHIO.

MANDREL.

Application filed September 8, 1919. Serial No. 322,551.

*To all whom it may concern:*

Be it known that I, Ross E. Jenkinson, a citizen of the United States, and resident of Akron, Ohio, have invented new and useful Improvements in Mandrels, of which the following is a specification.

My invention relates to a mandrel, and has particular reference to a circular mandrel to be used in the manufacture of rubber inner tubes for pneumatic tires.

It has hitherto been customary to cure or vulcanize tire inner tubes on straight tubular mandrels, the tube being slipped on the mandrel, wrapped with cloth and placed in the vulcanizer. The resulting vulcanized tube is straight, and it is necessary in order to produce the finished inner tube to bring the ends together and cement them. When the ends of a straight tube are thus joined to form an annulus, the material on the inner periphery, which is appreciably shorter than that of the outer, is caused to buckle, while that on the outside is somewhat stretched, and consequently there is more material per unit area on the inner surface than the outer. Hence, when the tire is inflated there is tendency for the outer periphery to be weaker than the inner.

It is, therefore, an object of my invention to provide a circular or annular mandrel on which an inner tube may be cured to produce a circular tube which is so formed that its entire wall is of uniform thickness and strength.

It is a further object of my invention to provide a mandrel, so constructed that when the inner tube is mounted thereon, and the whole wrapped for curing, it can be suspended in a vulcanizer without any weight being brought to bear on the tube, thereby preventing any flattening of the uncured sidewall.

It is a still further object of my invention to provide a mandrel that can be used with as great facility as a straight mandrel, and with which the operations can be as quickly carried out.

These and other objects and advantages will appear as the description proceeds, and the invention will be defined in the appended claims.

In the drawings, wherein I have illustrated a preferred embodiment of my invention:

Figure 1 is an elevation of the mandrel with parts broken away;

Figure 2 is an end view looking in the direction of the arrow toward the movable element of the mandrel;

Figure 3 is a section on the line 3—3 looking in the direction of the arrows; and Figure 4 is a partial section taken on a circumferential median line.

Referring now to the drawings, 10 is a hollow mandrel forming an almost complete circle or annulus, a sufficient space, however, being provided to permit easy access to the ends 11 and 12 for slipping an uncured inner tube 13 thereon, the tube being of such length as not to enclose the entire mandrel, and for the purpose of having a free portion by which the mandrel may be suspended as will appear below.

Inside the end 11 is mounted a latch support 14 which consists of a circular plate 15, substantially filling the circular area of the mandrel, through one side of which plate is riveted a pin 16, bearing two spring fingers 17 whose inwardly curved inner faces are normally close together, yet will spring apart sufficiently to receive a pin thrust therebetween and thus act as a latch, as will be presently described. The plate 15 is secured in place in the mandrel by a bracket-like element 18 to which it is bolted or otherwise fastened, said bracket element 18 being supported by a tapered pin 19 passing through the side wall of the mandrel and wedged into an opening in the bracket.

Inside the other end 12 of the mandrel 10 is slidably mounted, so as to telescope therewithin, a segment 20 having an arc corresponding to the arc of the mandrel. The segmental member 20 is provided on its side wall with a pin 21, which is adapted to pass between and be held by the spring-fingers 17, when the segment 20 is pulled out of the mandrel, which forms a sleeve therefor, and brought across the gap between the ends 11 and 12.

The mandrel is used in the following manner:

The uncured inner tube, which as produced, is straight, is slipped on to the free end 11 of the mandrel 10, the segment 20 lying within the other end 12, as shown in Fig. 1. The tube is moved around the mandrel to a proper position so that its ends are about the same distance from the ends of the mandrel. The segment 20 is then pulled out and across the gap and its pin 21 pressed between the spring-fingers 17, whereby the segment closes the circle and is held there, as shown in Fig. 4. The mandrel and tube thereon are then wrapped by winding a strip of cloth helically thereon, preparatory to vulcanization. The mandrel, with its tube and wrapping, is then vertically suspended in a vulcanizing chamber, by a support which passes under the portion of the mandrel not covered by the tube, that is to say, between the ends of the tube, and it is to be noted, that it is a feature of my invention to provide for such a suitable supporting portion, to prevent any localized pressure which would have a tendency to depress the wall and cause thin weak points therein.

After vulcanization, the wrapping is removed, the pin 21 disconnected from the spring-fingers 17, by simply pulling the segment 20 away, and the latter is pushed back into the mandrel. The cured tube 13 is stripped from the mandrel and is ready to have its ends secured together to form a complete circular tube.

The circular tube produced by the use of the above described mandrel will have a wall of uniform thickness, and therefore, of uniform strength, throughout, so that when inflated there will be no weak portions as frequently occurred when tubes were cured on straight mandrels, as explained above. Further, the use of the circular mandrel is as simple as that of straight mandrels, and the operations can be performed as quickly.

While I have shown but one embodiment of my invention, it will be understood that changes and modifications may be made which come within the scope of the appended claims, without in any sense departing from the essence of my invention.

What I claim is:

1. A substantially circular mandrel having end portions arranged in spaced relation, and means adapted for movement about the axis of the mandrel for closing the space between the end portions thereof.

2. A mandrel substantially circular in shape, and having a portion thereof cut away, and an element telescoping with a portion of said mandrel for closing said cut away portion to form a complete circle.

3. A mandrel substantially circular in shape, and having a portion thereof cut away, and an element telescoping within a portion of said mandrel for closing said cut away portion to form a complete circle.

4. A substantially circular mandrel having end portions arranged in spaced relation, means adapted for movement about the axis of the mandrel for closing the space between the end portions thereof, and means for latching the first means in its closing position.

5. A mandrel substantially circular in shape, and having a portion thereof cut away, and a segmental sliding element the arc of which is concentric with that of the mandrel telescoping with a portion of said mandrel for closing said cut away portion to form a complete circle.

6. A mandrel substantially circular in shape, and having a portion thereof cut away, and a segmental sliding element the arc of which is concentric with that of the mandrel, telescoping within a portion of said mandrel for closing said cut away portion to form a complete circle.

7. A substantially circular mandrel having end portions arranged in spaced relation, and means adapted for movement concentrically of the axis of the mandrel for closing the space between the end portions thereof.

8. A mandrel substantially annular in shape, and having a portion of said annulus cut away, an element slidably engaged by one portion of said annulus and adapted to advance to engagement with another portion of said annulus for closing said cut away portion and providing a supporting surface for said mandrel and a releasable self-locking device for holding said element in closed position.

9. A mandrel substantially annular in shape, and having a portion of said annulus cut away, a segmental element telescoping with a portion of said mandrel, for closing said cut away portion to form a complete annulus and providing when closed a supporting surface for said mandrel, and means for temporarily locking said segmental element in its closing position.

10. A substantially circular mandrel having end portions arranged in spaced relation, and means adapted for sliding movement thereon about the axis of the mandrel for closing the space between the end portions thereof.

11. A mandrel substantially annular in shape, and having a portion of said annulus cut away, a segmental element telescoping with a portion of said mandrel, for closing said cut away portion to form a complete annulus, and means for temporarily locking said segmental element in its closing position.

12. A mandrel substantially annular in shape, and having a portion of said annulus cut away, a segmental element having an arc concentric with that of the annulus and telescoping with a portion of said mandrel, for closing said cut away portion to form a complete annulus, and means for temporarily locking said segmental element in its closing position.

13. A substantially circular mandrel having end portions arranged in spaced relation, means adapted for sliding movement thereon about the axis of the mandrel for closing the space between the end portions thereof, and means for latching the first means in its closing position.

14. A substantially circular mandrel having end portions arranged in spaced relation, and means for closing the space between the end portions of the mandrel having a sliding movement thereon concentrically of the mandrel axis.

15. A mandrel substantially annular in shape, and having a portion of said annulus cut away, a segmental element telescoping with a portion of said mandrel for closing said cut away portion to form a complete annulus, and latching mechanism for temporarily locking said segmental element in its closing position.

16. A mandrel substantially annular in shape, and having a portion of said annulus cut away, a segmental element having an arc concentric with that of the annulus and telescoping with a portion of said mandrel, for closing said cut away portion to form a complete annulus, and latching mechanism for temporarily locking said segmental element in its closing position.

17. A mandrel substantially annular in shape, and having a portion of said annulus cut away, the ends adjacent said cut away portion being hollow, a latch mounted in one of said ends, an arc shaped element slidable within the other of said ends, said arc shaped element having a pin engageable by said latch, whereby said arc shaped element can be moved to close said cut away portion and be held there by said latch.

18. A mandrel substantially annular in shape, and having a portion of said annulus cut away, the ends adjacent said cut away portion being hollow, a spring latch mounted in one of said ends, an arc shaped element slidable within the other of said ends, said arc shaped element having a pin engageable by said latch, whereby said arc shaped element can be moved to close said cut away portion and be held there by said latch.

19. A mandrel substantially annular in shape, and having a portion of said annulus cut away, the ends adjacent said cut away portion being hollow, a spring latch mounted in one of said ends, an arc shaped element slidable within the other of said ends, said arc shaped element having a pin engageable by said latch, whereby said arc shaped element can be moved to close said cut away portion and be held there by said latch to provide a supporting surface for said mandrel.

In witness whereof, I have hereunto signed my name in the presence of two subscribing witnesses.

ROSS E. JENKINSON.

Witnesses:
J. E. KEATING,
PHILIP E. BARNES.